T. MEDLEY.
Feed-Bags for Horses.
No. 157,339. Patented Dec. 1, 1874.
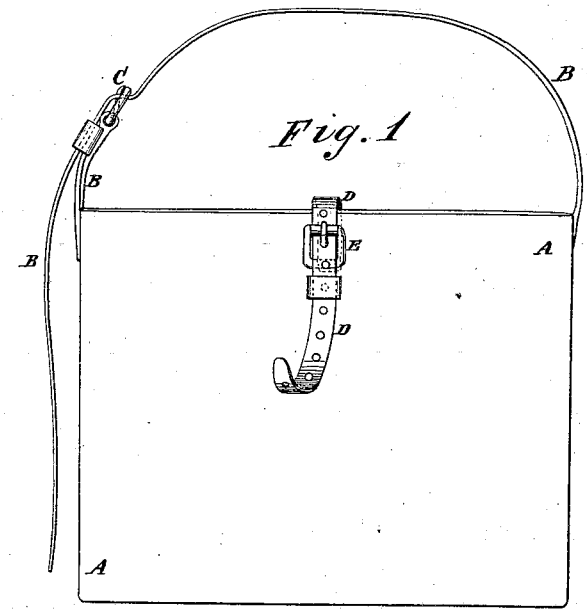
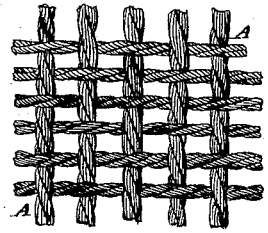
WITNESSES:
INVENTOR:
Thomas Medley
BY
ATTORNEYS.

UNITED STATES PATENT OFFICE.

THOMAS MEDLEY, OF NEW YORK, N. Y.

IMPROVEMENT IN FEED-BAGS FOR HORSES.

Specification forming part of Letters Patent No. 157,339, dated December 1, 1874; application filed September 19, 1874.

*To all whom it may concern:*

Be it known that I, THOMAS MEDLEY, of New York city, in the county and State of New York, have invented a new and useful Improvement in Horse Feed-Bag, of which the following is a specification:

Figure 1 is a side view of my improved feed-bag. Fig. 2 is a detail view of a portion of the same enlarged.

Similar letters of reference indicate corresponding parts.

The invention will first be fully described, and then pointed out in the claim.

A represents the body of the bag, which is made of a piece of hair-cloth, which I prefer to make of the same width as the width of the bag, so as to have selvages at the seams to increase its strength, while avoiding hemming its edges, which would make the seams thick and bungling. The cloth is made by twisting the horse-hair into cords of two or more strands of a proper thickness, and then weaving these cords into a loose cloth. By this construction the meshes of the cloth will be of such a size as to allow air and the dust from the grain to pass through readily, while the grain itself will be held securely. This cloth will be wholly unaffected by rain and frost, so that the meshes cannot be closed by wetting the cloth; and should it get muddy, it may be easily and thoroughly cleaned by rinsing it in clean water. To the opposite sides of the mouth of the feed-bag, preferably at the seams, are attached two straps, B, one of which is short, and has a buckle, C, attached to it, and the other is made long, to pass over the horse's head, and buckle into the buckle C, to secure the bag while the horse is feeding. To the opposite sides of the mouth of the bag A, midway between the straps B, are secured two short straps, D, to one of which is attached a buckle, E, and the other is made of sufficient length to buckle into the buckle E and secure the mouth of the bag when closed, and thus prevent the grain contained in the bag from spilling out.

I am aware that nose-bags for feeding horses, made of open-work fabric, have been long used; but woolen or cotton fabrics, when moistened by the breath, are liable to gather dirt, clog, and become saturated with the unhealthy exhalations from the horse's nose, thus causing the inspired air to reconvey to the lungs the seeds of disease.

It is my object to avoid anything that will become moistened, or is in its nature an absorber and bad transmitter of air. Hence

What I claim is—

As a new article of manufacture, a horse's feed or nose bag, made of coarse horse-hair, twisted into strands, and woven into a reticulated cloth, as shown and described.

THOMAS MEDLEY.

Witnesses:
JAMES T. GRAHAM,
T. B. MOSHER.